April 7, 1936. C. F. WELLS 2,036,309
SEAL FOR STIRRING DEVICES IN CHEMICAL APPARATUS
Filed July 18, 1934
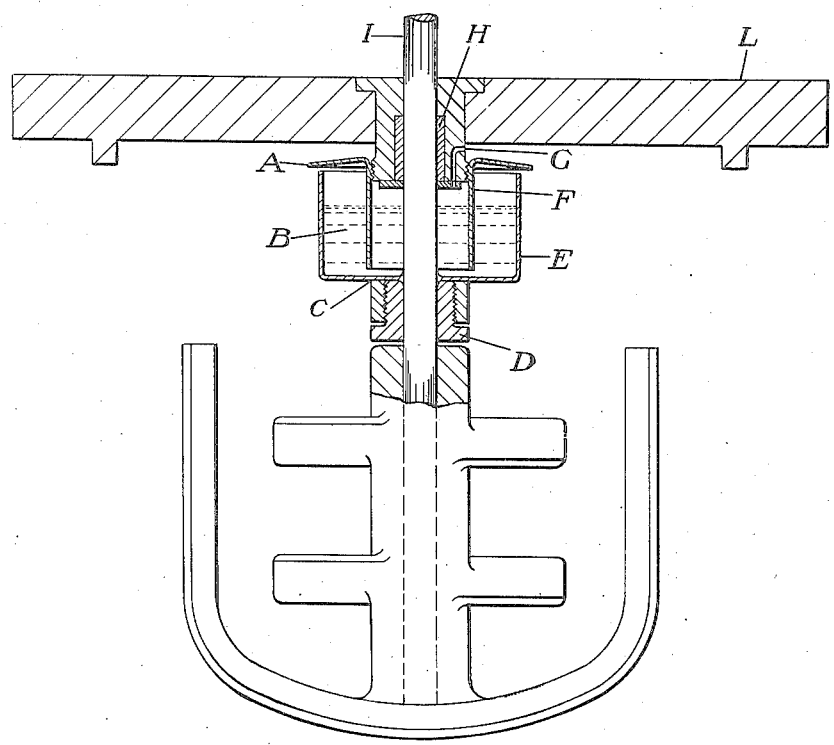
Clarence F. Wells INVENTOR.
BY Paul J Culhane
ATTORNEY.

UNITED STATES PATENT OFFICE 2,036,309

SEAL FOR STIRRING DEVICES IN CHEMICAL APPARATUS

Clarence Floyd Wells, Marshallton, Del., assignor to E. I. du Pont de Nemours & Company, Wilmington, Del., a corporation of Delaware Application July 18, 1934, Serial No. 735,905

7 Claims. (Cl. 23—290)

This invention relates to chemical apparatus, more particularly to stirring apparatus therefor, and specifically to a new variety of device for the prevention of contamination of the reactants in an autoclave or other reaction device by impurities derived from the packing in the stuffing box.

The ordinary Witt-type stirrer sealing cup commonly used in the laboratory consists of an outer cup fixed to the bearing of the stirrer shaft, an inner cup fixed to the stirrer shaft and rotating therewith, and a sealing liquid forming a seal between the inner and outer cup. This type of seal is used to prevent the escape of vapors from within the container.

This invention has as an object the provision of a new stirrer sealing device. A further object is the prevention of contamination of the reacting ingredients by impurities derived from the lubrication or packing connected with the stirrer shaft. Other objects will occur hereinafter.

These objects are accomplished by the following invention wherein the stirrer is provided with a sealing means which comprises an outer cup fixed at the lower end thereof to the shaft of the stirrer and coaxial therewith, an inner cup fixed at the upper end thereof to the bearing within which said stirrer revolves and coaxial with said stirrer, and a sealing liquid within said outer cup and into which the inner cup dips. Further contamination is avoided by the use of two auxiliary devices, the one being a hood extending over the stirring device and beyond the periphery of the outer cup, and the second, a pressure equalizing opening between the reaction chamber and the space above the sealing liquid within the inner cup.

Figure 1 is a section of the device. L indicates the top of the autoclave or other reaction chamber within which top a bearing H, for the shaft I, is placed. Upon shaft I there is fixed the outer cup E, by means of gasket C, and flange D. Within the outer cup there is a body B of liquid into which dips inner cup F. The inner cup F is fixed at its upper end to the extension of the autoclave top L. A is a hood, likewise fixed to the extension of the autoclave L, and may or may not be integral with inner cup F. G represents an opening between the reaction chamber and the space above the liquid within the inner cup F.

The primary purpose of the new sealing device of the present invention is the prevention of contamination from above rather than the escape of reactants from below. The inner cup F is attached to the head of the autoclave and does not rotate with the stirrer as does the Witt stirrer sealing cup. The outer cup E is attached to the stirrer shaft and rotates therewith, whereas in the Witt-type stirrer the outer cup remains stationary. The sealing liquid B comes in direct contact with the stirrer shaft. The opening G allows an equalized pressure on both sides of the cup so that in case a leak develops around the shaft the sealing liquid is not forced up thru the packing.

The new stirring apparatus herein described is of general use in the carrying out of reactions where it is desirable or even necessary to avoid contamination of the reactants by materials derived from the lubrication and packing of the stirrer. The etherification and esterification of cellulose, starch, or other carbohydrates are examples of such reactions.

The sealing liquid used is preferably one which has the property of wetting the metal or other material of which the cup and shaft are constructed. Mercury, the material usually used in the Witt-type stirrer cup, is not generally satisfactory for the present type sealing cup, since it does not wet the metal, and the graphite, oil, etc. from the packing gradually works down thru the inner cup and out thru the outer cup and in that way are introduced into the reaction mixture, altho of course at a considerably later time than in the case of a stirrer unprovided with any sealing device. The sealing liquid, in order to effectively prevent the graphite and oil from getting into the reaction mixture, must wet the material of the cup and bearing, which is in general metal. A number of liquids can be used for this purpose; one of the simplest is caustic soda solution. Others which can be used are caustic potash solution, sodium carbonate solution, potassium carbonate solution, sodium chloride solution, glycerin, or any other polyhydric alcohol or solution thereof, sucrose or glucose solution, aqueous solutions of salts which possess the property of wetting metals, and liquid fatty acids such as oleic acid. The sealing liquids can be varied in accordance with the nature of the reactants used in the autoclave. In general, acids such as sulfuric acid would not be used because of corrosion of the apparatus, but under certain very special conditions these may even be used. In general the sealing liquid should:

1. Be able to wet the metal of which the cup and shaft are constructed.

2. Not be miscible with oil or grease nor form an emulsion with either the graphite or grease or both.

3. Be substantially unreactive with the volatile ingredients in the autoclave or reaction chamber.

4. Have a reasonably high density so that lumps of graphite, particles of packing or other foreign matter would have a tendency to float on top of the sealing liquid.

5. Have no appreciable corrosive action on the metal.

The principal advantage of the sealing device of the present invention is the prevention of contamination from graphite, grease, oil, etc., from the packing. The opening between the reaction chamber and the space above the liquid in the inner cup equalizes pressure and prevents forcing of liquid ingredients up thru the packing. The hood above the sealing device prevents contamination of sealing liquid by volatile ingredients of the reaction mixture.

The above description and examples are intended to be illustrative only. Any modification of or variation therefrom which conforms to the spirit of the invention is intended to be included within the scope of the claims.

I claim:

1. In an apparatus for conducting chemical reactions a sealing means for a stirring device, which comprises an outer cup fixed at its lower end to the shaft of the stirrer and coaxial therewith, an inner cup fixed at its upper end to the bearing within which said stirrer revolves and coaxial with said stirrer, and a sealing liquid within said outer cup and into which said inner cup dips, said sealing liquid being a caustic alkali solution.

2. The apparatus of claim 1 in which the sealing liquid is a caustic soda solution.

3. In an apparatus for conducting chemical reactions a sealing means for a stirring device, which comprises an outer cup fixed at its lower end to the shaft of the stirrer and coaxial therewith, an inner cup fixed at its upper end to the bearing within which said stirrer revolves and coaxial with said stirrer, a sealing body of liquid within said outer cup and into which said inner cup dips, a pressure equalizing opening between the reaction chamber and the space above said sealing liquid within said inner cup, and a hood fixed to the top of the reaction chamber and extending beyond the periphery of said outer cup.

4. The apparatus of claim 3 in which the sealing liquid is one which wets the material of the shaft and inner cup.

5. The apparatus of claim 3 in which the sealing liquid is an aqueous solution.

6. The apparatus of claim 3 in which the sealing liquid is a caustic alkali solution.

7. The apparatus of claim 3 in which the sealing liquid is a caustic soda solution.

CLARENCE FLOYD WELLS.